United States Patent
Aschir et al.

(10) Patent No.: US 6,535,741 B1
(45) Date of Patent: Mar. 18, 2003

(54) TELECOMMUNICATIONS NETWORK AND METHOD FOR ROUTING INCOMING CALLS FOR MTC SERVICES

(75) Inventors: Alexander Aschir, Berlin (DE); Andreas Berg, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/408,686

(22) Filed: Sep. 30, 1999

(30) Foreign Application Priority Data

Apr. 26, 1999 (DE) .......................... 199 24 811
Jul. 16, 1999 (DE) .......................... 199 33 547

(51) Int. Cl.[7] ...................... H04Q 7/20; H04M 7/00
(52) U.S. Cl. .................. 455/445; 455/428; 379/221.09; 379/221.1
(58) Field of Search .................. 455/461, 445, 455/426, 428, 439, 554, 555; 379/221.08, 221.09, 221.1, 221.11, 221.12

(56) References Cited

U.S. PATENT DOCUMENTS 5,511,113 A * 4/1996 Tasaki et al. ............... 379/112
5,610,972 A * 3/1997 Emery et al. ............... 455/414
6,011,975 A * 1/2000 Emery et al. ............... 455/456
6,122,510 A * 9/2000 Granberg .................... 455/433
6,192,237 B1 * 2/2001 Clapton et al. ............. 455/422

OTHER PUBLICATIONS

GSM Technical Specification, GSM 02.78, Jan. 1998, pp. 1–30.

* cited by examiner

*Primary Examiner*—Edward F. Urban
*Assistant Examiner*—Sheila Smith
(74) *Attorney, Agent, or Firm*—Laurence A. Greenberg; Werner H. Stemer; Ralph E. Locher

(57) ABSTRACT

If, during the initialization of an MTC service for a subscriber (TNB) to a telecommunications network which is in the form of a an overlay network, the performance required to carry out the service exceeds the performance level supported by the access SSP node (SS1), the service control point (SCP) uses the call address to produce a routing address which contains information relating to further routes of the call to a second SSP node (SS2) which supports the required performance level, and transmits (5) this to the first SSP node (SS1) for passing it on.

7 Claims, 1 Drawing Sheet

TELECOMMUNICATIONS NETWORK AND METHOD FOR ROUTING INCOMING CALLS FOR MTC SERVICES

BACKGROUND OF THE INVENTION

Field of the Invention

The invention relates, in general, to a telecommunications network and a method of operating a telecommunications network, and in particular, to a telecommunications network having a service control point for controlling and carrying out intelligent services, and service switching points which, in order to switch service components of intelligent services, each support a predetermined performance level in accordance with a predetermined application protocol.

The invention likewise relates, in particular, to a method for routing an incoming communications link in a telecommunications network of the type mentioned above, in which a service initialization message is sent to the service control point by a first service switching point in the network as a consequence of a call request arriving at it for a communications link to a subscriber in the network who has subscribed to at least one intelligent service which can be activated for incoming calls.

In conjunction with modern telecommunications networks, it is known that, in addition to basic services such as the telephone services and fax services in a telephone network, other connection-oriented services are set up which can be addressed by a subscriber to the network. These other connection-oriented services are referred to as intelligent services in the following text. The network that supports these services is referred to as an intelligent network (IN). The conventional architecture of the intelligent network provides, in addition to network devices having a service switching function, the so-called service switching points or SSP nodes, and service control points (SCP) as devices for controlling and carrying out intelligent additional services in the intelligent network. The service switching nodes and service control nodes are connected to one another via signaling paths.

For mobile radio networks according to the GSM Standard ("Global System for Mobile Communication"), a so-called CAMEL platform ("Customized Applications for Mobile network Enhanced Logic") has been defined in order to allow world-wide use of the service features of the intelligent network. In a mobile radio network, the service switching nodes are normally referred to as M-SSP ("Mobile SSP"). A specific protocol is in this case used as the "application part" and for the mobile radio network, comprises the CAP protocol ("CAMEL Application Part", see GSM 09.78).

For further information relating to CAMEL and the CAP protocol, reference should be made to the following GSM Standards: GSM 02.78 "Digital cellular telecommunications system (Phase 2+, Customized Applications for Mobile Network Enhanced Logic (CAMEL) Service Definition (Stage 1);" GSM 03.78 "Digital cellular telecommunications system (Phase 2+), Customized Applications for Mobile Network Enhanced Logic (CAMEL Phase) (Stage 2);" and GSM 09.78 "Digital cellular telecommunications system (Phase 2+), Customized Applications for Mobile Network Enhanced Logic (CAMEL) CAMEL Application Part (CAP) specification.".

The CAP for the first time created a protocol between M-SSP and SCP which offered roaming IN subscribers, that is subscribers who also move beyond the supply area of their home network (HPLMN, "Home Public Line Mobile Network") into other visited networks (VPLMN, "Visited Public Line Mobile Network"), intelligent services outside their home network as well while making the services available to subscribers in the home network itself. According to GSM 09.78, the CAP protocol provides a fixed set of functions, the so-called Capability Set 1 (CSI). When the CAP protocol was introduced, CAP phase 1, according to the GSM Standard relating to GSM 02.78 "Digital cellular telecommunications system (Phase 1), Customized Applications for Mobile Network Enhanced Logic (CAMEL) Service Definition (Stage 1);" GSM 03.78 "Digital cellular telecommunications system (Phase 1), Customized Applications for Mobile Network Enhanced Logic (CAMEL Phase) (Stage 2);" and GSM 09.78 "Digital cellular telecommunications system (Phase 1), Customized Applications for Mobile Network Enhanced Logic (CAMEL) CAMEL Application Part (CAP) specification," provided only a subset of the CS1. Therefore, CAP Phase 1 includes only a very limited instruction set of the intended CS1. Using the seven operations implemented in CAP Phase 1 (instead of the 29 CS1), it is not possible to implement complex intelligent services. These services require a more comprehensive set of instructions, such as those that would be available, in particular, from the CS1. In order to implement such an intelligent service, the link to an M-SSP is routed in a known way on the basis of the intermediate exchange signaling process in the ISUP, which M-SSP can manage the dialog with the SCP via an INAP protocol ("Intelligent Network Application Part"), since the operational scope of the CS1 is implemented in the INAP protocol. On the other hand, intelligent services that can be implemented within the scope of the CAP Phase 1 are not passed on, but are carried out in the relevant M-SSP.

For intelligent services which are started for outgoing calls from visitor networks, a so-called MOC Scenario (MOC="Mobile Originating Calls"), the published, non-prosecuted German Patent Application DE 198 14 162 A1 from the applicant describes a method for information transmission. Data and parameters can be transmitted between SCP and M-SSP, without the range of messages between the switching point associated with the connection of the calling subscriber, the home registers and that of the M-SSP having to be changed from those of the existing CAP and INAP protocols. Accordingly, during a first dialog via CAP of the M-SSP in the visitor network of the calling subscriber with an SCP in the home network of the calling subscriber, all the parameters for the start operation which is carried out, in accordance with the GSM Standard by means of an IDP message ("Initial Detection Part") are temporarily stored and the call is then passed on to an INAP-compatible M-SSP in the home network. A second dialog is set up there via the INAP protocol to the same SCP in which the original parameters of the start operation (IDP message) are found again by means of correlation information ("correlation id") which is likewise transmitted so that the originally desired intelligent service can then be started by the INAP-compatible M-SSP.

However, the described MOC solution cannot be directly transferred to the situation where the intelligent service is initiated by the called subscriber, the so-called MTC scenario (MTC="Mobile Terminating Calls", "incoming calls"). This is because this would necessitate three dialogs with the SCP. A first connect dialog in accordance with the CAP, protocol to an IMAP-compatible M-SSP, a second connect dialog via the INAP protocol for the purpose of home-register interrogation between the INAP-compatible M-SSP and the home register, as well as a third dialog via the INAP protocol for carrying out operations which are demanded by the service logic, such as charging applications (so-called "apply charging") and routing operations. This would result in considerable signaling traffic. Such a solution therefore, appears to be virtually unacceptable for manufacturers as well as network operators.

In this context, it should be noted that there is no need to pass on incoming calls for an MTC service, provided the relevant mobile radio network is a fully integrated network, in which all switching points support an INAP protocol. For this purpose, suitable administration of the M-SSP nodes on the network can be used to ensure that the INAP protocol is used for an MTC service, although the visitor register and home register of the network in accordance with the GSM Standard support the MAP protocol (Mobile Application Part), and in particular MAP Version 3, and thus offer support for CAP Phase 1. However, networks in which not all the network nodes are INAP-compatible, so-called overlay networks, frequently occur. Thus, in overlay networks, there is no guarantee that the relevant M-SSP can use an INAP protocol where the operational scope of CAP Phase 1 is not sufficient for an MTC service. The discussed MAP protocol is described in more detail in GSM Standard GSM 09.02 (ETS 300 975) "Digital cellular telecommunications system (Phase 2+), Mobile Application Part specification".

SUMMARY OF THE INVENTION

It is accordingly an object of the invention to provide a method and a telecommunications network, which overcomes the above-mentioned disadvantageous of the methods and networks of this type, and which improves the routing of incoming calls for implementing intelligent services.

With the foregoing and other objects in view there is provided, in accordance with the invention, a telecommunications network that includes a plurality of service switching points for switching service components of intelligent services. Each one of the plurality of service switching points has a capacity to support a predetermined performance level in accordance with a predetermined application protocol. A service control point for controlling and carrying out the intelligent services is provided. The service control point is configured to receive, from a first one of the plurality of service switching points, a service initialization message relating to an incoming communications link to a subscriber in the network. The service control point is configured to determine whether the subscriber has subscribed to an intelligent service that can be activated for incoming calls and which exceeds the predetermined performance level of a first one of the plurality of switching points. The service control point is also configured so that if the determination is in the affirmative, the service control point produces a routing address that includes information relating to further routes for establishing a link to a second one of the plurality of service switching points that supports the performance level required for the at least one service and the service control point transmits the routing address to the first one of the plurality of service switching points.

The routing address that is sent to the first service switching node then, in accordance with well-known methods, causes the call to be routed to the second service switching node, which recovers the original subscriber address and continues the process of setting up the call, including the MTC service.

This solution ensures that MTC services are also carried out in overlay networks, without it being necessary to upgrade the service switching nodes. It is particularly advantageous that the routing process involves little additional signaling complexity.

In accordance with an added feature of the invention, the service control point is set up to check the performance levels supported by the service switching points and to select the second service switching point on the basis of subscription information transmitted by the first service switching point relating to the service or services assigned to the subscriber and relating to the associated number or performance levels. This avoids additional signaling between the service control node and a subscriber database for interrogation of the subscriber-specific service data.

In accordance with an additional feature of the invention, the network is in the form of a mobile radio network, and the service switching points each support the CAP protocol or the INAP protocol. In this case, as already explained, the CAP protocol represents a lower performance level, for which the INAP protocol provides an overall scope of service features.

With the foregoing and other objects in view there is provided, in accordance with the invention, a method for routing an incoming communications link in a telecommunications network, which includes providing a telecommunications network with a service control point for controlling and carrying out intelligent services; a plurality of service switching points for switching service components of intelligent services; and a subscriber that has subscribed to at least one intelligent service that can be activated for incoming calls. Each one of the plurality of service switching points is provided with the capacity to support a predetermined performance level in accordance with a predetermined application protocol. The method also includes sending, to a first one of the plurality of service switching points, a call requesting a communications link with the subscriber. In response to the call, a service initialization message is sent from the first one of the plurality of service switching points to the service control point. Subsequently, it is determined whether the at least one service subscribed to by the subscriber exceeds the predetermined performance level of the first one of the plurality of service switching points. The service control point is used to make the determination. If the determination is in the affirmative, the method further includes the following subsequent steps. With the service control point, producing a routing address, using the call address of the subscriber, so that the routing address includes information relating to further routes for establishing a link to a second one of the plurality of service switching points that supports the performance level required for the at least one service subscribed to by the subscriber. With the service control point, transmitting the routing address to the first one of the plurality of service switching points. With the first one of the plurality of service switching points, routing the call to the second one of the plurality of service switching points using the routing address. Finally, with the second one of the plurality of service switching points, switching the at least one service subscribed to by the subscriber.

In accordance with an added mode of the invention, a subscriber database is provided for storing data relating to subscribers registered in the network including data relating to the at least one intelligent service. The subscriber database is also for storing data relating to the predetermined performance level of at least one of the plurality of service switching points. The subscriber database is interrogated with the first one of the plurality of service switching points to obtain information. The information is transmitted from the first one of the plurality of service switching points to the service control point. With the service control point, the predetermined performance level of at least one of the plurality of service switching points is checked. With the service control point, the second one of the plurality of the service switching points is selected dependent upon the data in the subscriber database.

In accordance with an additional mode of the invention, the telecommunications network is a mobile radio network; and each one of the plurality of service switching points is configured to support a protocol selected from the MAP protocol and the INAP protocol.

In accordance with a concomitant mode of the invention, the subscriber database is provided in a mobile radio network.

The advantages of the method according to the invention and of its refinements correspond to what has been described on the basis of the telecommunications network according to the invention.

Other features which are considered as characteristic for the invention are set forth in the appended claims.

Although the invention is illustrated and described herein as embodied in a telecommunications network and method for routing incoming calls for MTC services, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
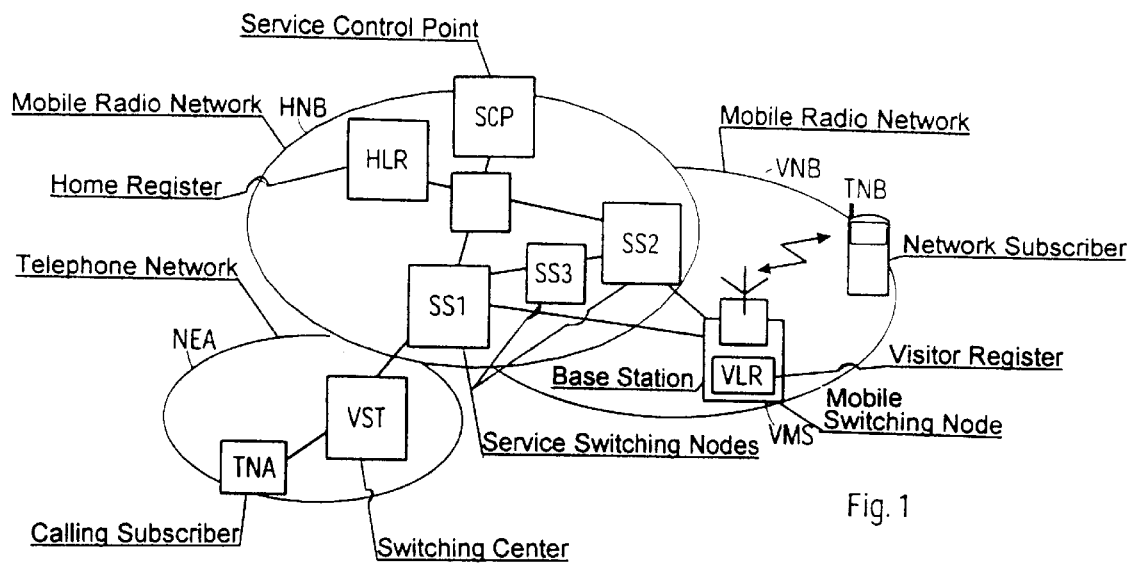
FIG. 1 shows an overlay network.

Referring now to the figures of the drawings in detail and first, particularly, to FIG. 1 thereof, there is seen an exemplary embodiment relating to MTC processing of an intelligent service for a subscriber to a mobile radio network. FIG. 1 shows the components of a mobile radio network HNB to the extent required for an understanding of the invention. The subscriber TNB is registered with the network HNB and therefore the network HNB is assigned to the subscriber TNB as the home network. In a known way, in addition to service switching nodes SS1, SS2, SS3, the network HNB has a node set up as the home register HLR, as well as a service control point SCP. These network nodes are connected to one another, for example, by links as shown in the drawing.

However, the topology of the links in the illustrated network configuration is not important to the invention. The subscriber TNB is logged-on via a base station with a mobile switching node VMS ("visited mobile switching center"), which therefore, at least temporarily, acts as the current location node of the subscriber TNB. A visitor register VLR is set up in the mobile switching node VMS for administering the subscriber data for the subscriber TNB as well as other mobile subscribers (not shown) who have logged on there.

It should be noted that it is not important whether the mobile switching center VMS is part of the home network HNB of the subscriber TNB or part of another mobile radio network VNB in which the subscriber is temporarily located (so-called roaming). FIG. 1 shows the latter case and this representation should not imply any limitation of the invention.

FIG. 1 shows another subscriber TNA, which is intended to represent the calling subscriber for the purpose of describing the invention. The calling subscriber TNA is connected via a switching center VST in a telephone network NEA, for example a land line network which is independent of the network configurations HNB and VNB. In order to allow calls to be made between the networks NEA and HNB, a link is provided from the network NEA to the switching center SS1. In a corresponding manner, the switching center SS1 is set up as a so-called access switching center. In mobile radio networks, access switching centers are referred to by the term GMSC ("Gateway Mobile Switching Center").

It should be noted that the illustrated embodiment of the invention and, in particular, the illustrated network configuration is used only as an example for explaining the invention and should not be regarded as limiting the invention. For example, the calling subscriber TNA may also be a mobile subscriber in the same mobile radio network as the called subscriber TNB.

Corresponding to the precondition of the invention, the network of the called subscriber is an overlay network. In particular, the M-SSC node SS1 which acts as the GMSC for the calling subscriber supports only a subset of the performance level of the CAP protocol, such as the CAP Phase 1, but not an INAP protocol. The node SS1 therefore cannot be relied upon to carry out an MTC service that exceeds the instruction set of its performance level.

For incoming calls (MTC Scenario in overlay networks), in the case where the SSP node which is used as the access switching device is not an INAP-compatible service switching point, that is to say the dialog with the SCP is started as a CAP dialog in accordance with MAP Version 3, the call is passed on with the aid of a routing address to another, INAP-compatible M-SSP.

Figure 2:
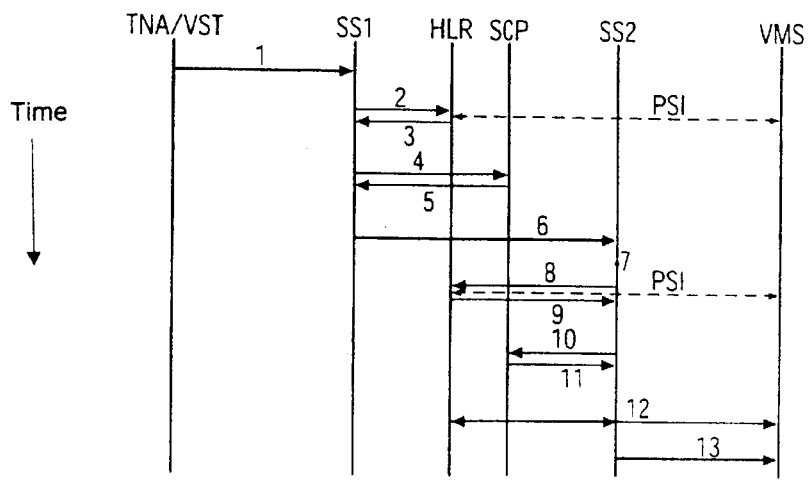
FIG. 2 shows a signaling sequence for routing a call for an MTC service.

This is shown in FIG. 2 using an example of a signaling sequence, in which, starting from the subscriber TNA, a link is produced to the subscriber TNB, and an MTC service is carried out for this subscriber TNB. In FIG. 2, the time axis runs from top to bottom. The vertical lines represent the signaling stations (subscribers and network nodes) in FIG. 1, corresponding to the reference symbols used.

The details of the process of setting up a call carried out in the network NEA of the calling subscriber are not shown in FIG. 2, since these are not important to the invention and are well known to a person skilled in the art. For routing the connection to the network HNB, a call request 1 in the form of an IAM message ("Initial Address Message") in accordance with ISUP is sent in a known way to the M-SSC node SS1 that is used as the access switching center.

The node SS1 uses the received call request 1 in a manner which is likewise known to initiate a two-step interrogation 2, 3 in accordance with MAP Version 3 with the home register HLR, which is assigned to the subscriber TNB. According to the MAP protocol, the interrogation includes a question 2 in the form of an SRI message and an associated answer 3 in the form of an SRI-Ack message. If necessary, the home register carries out a location request PSI ("Provide Subscriber Information") in accordance with the MAP protocol, in order to obtain the data required to produce the message 3.

In addition to information relating to the location area of the called subscriber (in particular the identification of the current visitor register VLR), the answer message 3 contains T-CSI ("Terminal Call Subscriber Information") as information relating to the MTC services assigned to the subscriber TNB. Using the information contained in the T-CSI for carrying out MTC services, the node SS1 sends an IDP message 4 to the service control point SCP.

According to the invention, the service control node SCP checks that the desired service can be carried out using the performance level available in the service switching node SS1. In the illustrative example, the signaling of the message 4 is based on the CAP protocol instead of an INAP protocol. It is identified that the available performance level in the node SS1 is based on the CAP protocol, and is thus inadequate for the service specified on the basis of the T-CSI. The service control node SCP thus uses the subscriber call number of the subscriber TNB to produce a new call address, which is referred to as the routing address in the following text. According to the invention, the routing address ensures that the call is passed on to an INAP-compatible service switching node SS2. The service control node SCP sends a CONNECT message 5 in accordance with the CAP protocol, in which the routing address is entered in the CONNECT parameter "destination Routing Address", to the M-SSP node SS1.

In the illustrative example, the service control node SCP forms the routing address by placing a prefix, which is provided by the network operator HNB, in front of the original subscriber call number. For example, this prefix can be a sequence comprising a number of digits. This number can be administered by the operator, and the individual digits can themselves likewise be administered by the operator as a prefix. The prefix is expediently configured such that, during subsequent digit analysis by the access node SS1, interrogation of the home register is suppressed. This is achieved, for example, by the code point in the routing tables of the node SS1 for the digit sequence in the prefix being set up such that a trunk allocation is carried out, which passes on the call to SS2 but does not carry out the interrogation. In order to protect as many elements of the numbering plan as possible, hexadecimal digits may also be used as digits in the prefix in this case.

The M-SSP node SS1 receives the CONNECT message 5, and, on the basis of this message, passes on the call in accordance with the routing address, by allocating an outgoing connecting path (so-called trunk) and sending an IAM message 6 to the service switching node SS2. For the node SS1 to produce the message 6, the parameters used in the original initialization message 1 are transferred into the IAM message 6, with the exception of the IAM parameter "called Party Number", in which the routing address is copied from the CONNECT message 5.

The INAP-compatible M-SSP node SS2 to which the call is routed now uses the routing address to determine the original subscriber call number once again, in the step 7 which now follows, with the added prefix being cut off in the example. The call address obtained in this way, which matches the "called Party Address" of the initial IAM message 1, is subjected to digit analysis in a known manner in the node SS2. The call handling which now follows and originates from the INAP-compatible node SS2 corresponds to the situation as if the call request 1 had arrived directly at this node SS2. After a two-step interrogation 8, 9 (once again with a PSI request if appropriate), a dialog 10, 11 is carried out between the service control node SCP and the service switching node SS2. The dialog 10, 11 is carried out in a well-known manner according to the CAMEL Standard via the INAP protocol set up between the two nodes SCP and SS2. Furthermore, the MTC service subscribed to by the calling subscriber is initiated and carried out within the course of this INAP dialog. The rest of the process of setting up a call, for example repeated interrogation 12 with the home register and, finally, passing 13 of the call on to the current location node VMS of the calling subscriber is also carried out in a known manner. See, for example, the CAMEL Standards.

The trunk (see step 6 above) originating from the M-SSP node SS1 is either connected directly to the destination node SS2, or at least continues in this direction, for example as far as a node SS3. With the former case, in a sequence which differs from that described above, the node SS1 will itself ensure that the prefix is cut off when the trunk is allocated so that, particularly in the case of an ISUP trunk, the outgoing IAM message 6 already contains the originally dialed call number, which was included in a known manner in the "Called Party Number" parameter of the IAM message 1, without any need to add further digits. In the latter case, the prefix is cut off in the destination node SS2 or in a node SS3 arranged immediately upstream of the destination node in the routing profile.

We claim:

1. A method for routing an incoming communications link in a telecommunications network, which comprises:

providing a telecommunications network that includes:
   a service control point for controlling and carrying out intelligent services;
   a plurality of service switching points for switching service components of intelligent services; and
   a subscriber that has subscribed to at least one intelligent service that can be activated for incoming calls;

providing each one of the plurality of service switching points with the capacity to support a predetermined performance level in accordance with a predetermined application protocol;

sending, to a first one of the plurality of service switching points, a call requesting a communications link with the subscriber;

in response to the call, sending a service initialization message from the first one of the plurality of service switching points to the service control point;

subsequently, determining whether the at least one service subscribed to by the subscriber requires exceeding the predetermined performance level of the first one of the plurality of service switching points using the service control point to make the determination, and if so, subsequently:
   with the service control point, producing a routing address, using the call address of the subscriber, so that the routing address includes information relating to further routes for establishing a link to a second one of the plurality of service switching points that supports the performance level required for the at least one service subscribed to by the subscriber;
   with the service control point, transmitting the routing address to the first one of the plurality of service switching points;
   with the first one of the plurality of service switching points, routing the call to the second one of the plurality of service switching points using the routing address; and with the second one of the plurality of service switching points, switching the at least one service subscribed to by the subscriber.

2. The method according to claim 1, which comprises:

providing a subscriber database for storing data relating to subscribers registered in the network that includes data relating to the at least one intelligent service and for storing data relating to the predetermined performance level of at least one of the plurality of service switching points;

interrogating the subscriber database with the first one of the plurality of service switching points to obtain information;

transmitting the information from the first one of the plurality of service switching points to the service control point;

with the service control point, checking the predetermined performance level of at least one of the plurality of service switching points; and with the service control point, selecting the second one of the plurality of the service switching points dependent upon the data in the subscriber database.

3. The method according to claim 1, which comprises:

providing the telecommunications network as a mobile radio network; and configuring each one of the plurality of service switching points to support a protocol selected from the MAP protocol and the INAP protocol.

4. The method according to claim 1, which comprises providing the subscriber database in a mobile radio network.

5. A telecommunications network, comprising:

a plurality of service switching points for switching service components of intelligent services, each one of said plurality of service switching points having a capacity to support a predetermined performance level in accordance with a predetermined application protocol; and a service control point for controlling and carrying out said intelligent services;

said service control point being configured to receive, from a first one of said plurality of service switching points, a service initialization message relating to an incoming communications link to a subscriber in the network;

said service control point being configured to determine whether the subscriber has subscribed to an intelligent service that can be activated for incoming calls and which exceeds the predetermined performance level of a first one of said plurality of switching points;

said service control point being configured so that if the determination is in the affirmative, said service control point produces a routing address that includes information relating to further routes for establishing a link to a second one of said plurality of service switching points that supports the performance level required for said at least one service, and said service control point transmits said routing address to said first one of said plurality of service switching points, said first one of said plurality of service switching points being configured to route said calls to said second one of said plurality of service switching points using said routing address.

6. The telecommunications network according to claim 5, wherein:

said first one of said plurality of service switching points is configured to transmit subscription information to said service control point, said subscription information includes data relating to at least one intelligent service assigned to a subscriber and data relating to the predetermined performance level of at least one of said plurality of service switching points;

said service control point being configured to check said predetermined performance level of at least one of said plurality of service switching points; and said service control point being configured to select said second one of said plurality of said service switching points dependent upon said subscription information.

7. The telecommunications network according to claim 5, wherein:

the telecommunications network is a mobile radio network; and each one of said plurality of service switching points supports a protocol selected from the MAP protocol and the INAP protocol.

* * * * *